July 7, 1970     D. J. KULLMANN ET AL     3,518,880
METERING APPARATUS
Filed July 13, 1967     2 Sheets-Sheet 1
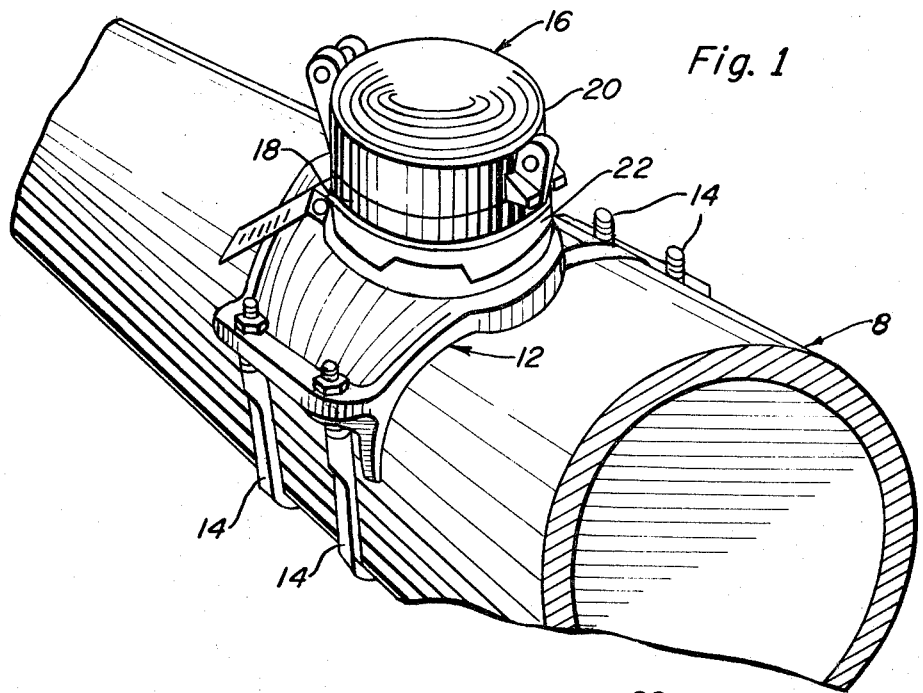
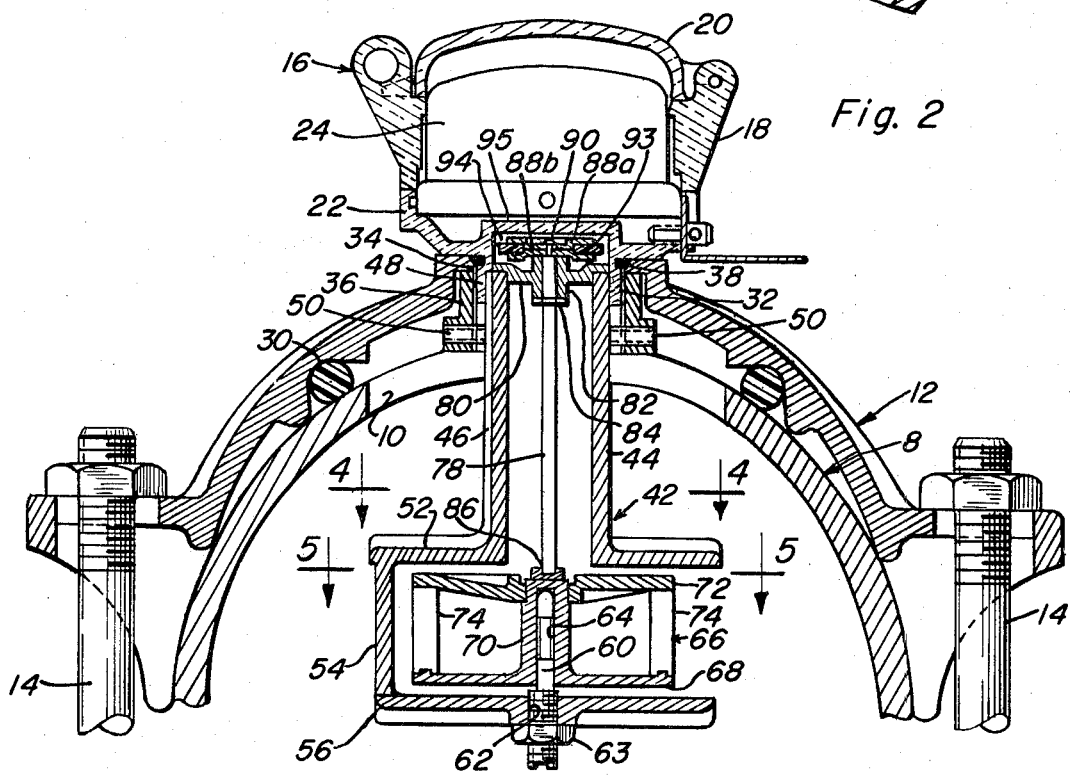
INVENTORS
DONALD J. KULLMANN
BY BERNARD M. SILVERBERG
PENDLETON, NEUMAN
SEIBOLD & WILLIAMS
ATTORNEYS

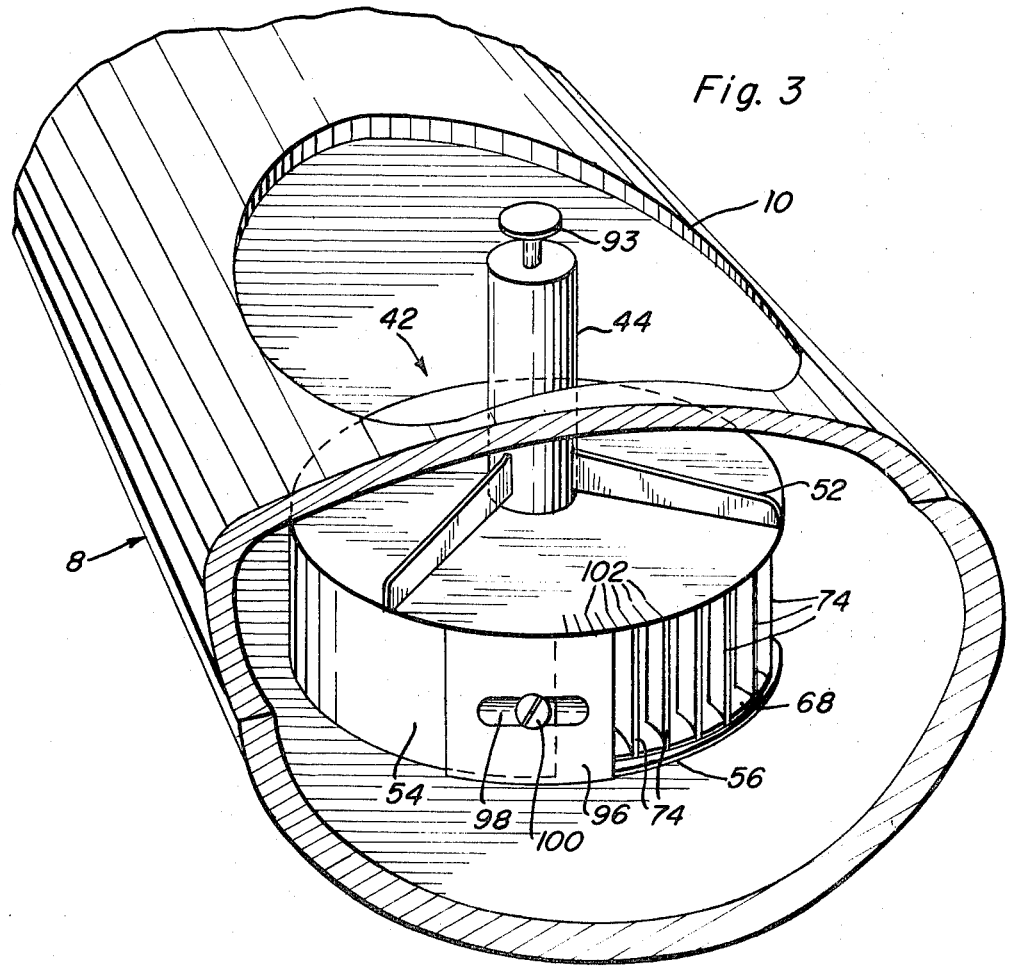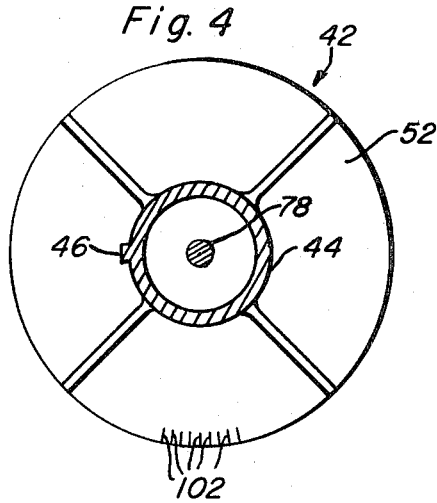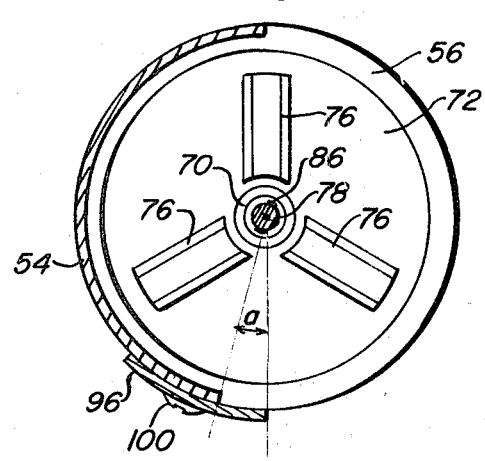

United States Patent Office 3,518,880  
Patented July 7, 1970

3,518,880  
METERING APPARATUS  
Donald J. Kullmann, Fox Point, and Bernard M. Silverberg, Glendale, Wis., assignors to Badger Meter Manufacturing Company, Milwaukee, Wis., a corporation of Wisconsin  
Filed July 13, 1967, Ser. No. 653,215  
Int. Cl. G01f 1/100, 1/06  
U.S. Cl. 73—229              17 Claims

ABSTRACT OF THE DISCLOSURE

A flowmeter having an impeller which is partially shielded, the shield being adjustable to effect calibration of the meter, and a drive shaft and a parallel support extending axially of the impeller to a register drive on a saddle adapted to be clamped to a conventional conduit over an opening in the conduit wall through which the impeller is inserted to be submerged in the flow stream.

BACKGROUND OF THE INVENTION

Field of the invention

This invention pertains to flowmeters and more particularly to impeller drives for flowmeters and to simple inexpensive flowmeters adapted to be easily mounted on conventional conduits, as in field installations for measuring water flow in irrigation systems.

Description of the prior art

The prior art includes a wide variety of meters for measuring fluid flow in conduits. However, such meters have exhibited various difficulties or disadvantages. Many require special housings or particular installation arrangements which preclude convenient field installations of the meters. Others are complex, expensive to manufacture, require change-gears or other adjusting devices in the register for calibration, and/or are of designs which require providing large openings in the conduit wall for installation thereby creating difficulties in effectively closing the installation opening and require that the impeller dimensions be closely matched to the inside dimensions of the conduit.

SUMMARY OF THE INVENTION

It is an object of this invention to provide an accurate, sensitive, meter having good linearity characteristics, which is of simple construction, requires no special conduit housing and is expensive to manufacture. It is a further object of this invention to provide such a meter in which a standard impeller and associated parts may be utilized in conduits over a wide range of conduit sizes, thereby providing further economies. It is another object of this invention to provide a meter which is easy to install on conventional conduits, requiring only a relatively small opening in the conduit wall whereby the opening may be readily sealed, and which presents a minimum obstruction to the flow of the fluid being metered, i.e., to provide a low pressure drop across the meter. It is a further object of this invention to provide a meter which may be conveniently calibrated in accordance with each particular installation, thereby permitting the use of a standard sealed register without change-gears or other register calibration means.

The foregoing objects are achieved in one illustrative embodiment of the invention by providing an impeller to be submerged in a flow stream with its axis of rotation transverse to the flow stream, a fixed shield extending over an upstream quadrant of the periphery of the impeller for protecting the covered segment of the impeller from dynamic impingement thereon of the flowing fluid, the shield being adjustable for selectively varying the coverage of the impeller at the upstream edge of the shield to effect calibration of the meter, and a drive shaft extending axially of the impeller to a register drive on a support adapted to be secured to a conventional conduit over an opening in the conduit wall through which the impeller is inserted for submergence in a flow stream therein.

For a more complete understanding of this invention, reference should now be had to the drawings wherein an embodiment is illustrated, as described below, by way of example of the invention.

BRIEF DESCRIPTION OF THE DRAWINGS

FIG. 1 is a perspective view of a meter assembly employing teachings of this invention;

FIG. 2 is an enlarged partial cross-sectional view of the meter apparatus of FIG. 1;

FIG. 3 is another perspective view, partially broken away and partially schematic, illustrating the register drive components of the meter assembly of FIG. 1; and FIGS. 4 and 5 are enlarged cross-sectional views taken generally along lines 4—4 and 5—5, respectively, of FIG. 2 and looking in the direction of the arrows.

DESCRIPTION

Referring first to FIGS. 1–3, the illustrated meter assembly includes a right circular cylindrical conduit 8 having an opening 10 in its wall to receive therethrough the drive components of the meter apparatus. A saddle 12 is secured to the conduit 8, over opening 10, by a pair of saddle straps 14 encompassing the conduit. A register hood 16, including a hood body 18 and a hinged cover 20, is secured to an adapter 22 mounted on the saddle in alignment with the opening 10. A totalizing register 24, preferably of the sealed, tamper-proof type having a rotatable magnet drive element (not shown), is disposed in the hood 16. An O-ring 30 engages an appropriate groove in the saddle 12 and is drawn into sealing engagement with the conduit 8, around opening 10, by the saddle straps 14.

With particular reference to FIGS. 2 and 3, the adapter 22 includes an annular neck portion 32, which extends through an opening 34 in the saddle. A nut 36 is threaded on neck portion 32 and engages the underside of saddle 12 around opening 34 whereby the adapter 22 is drawn into sealing engagement with an O-ring 38. It will be appreciated that the saddle 12, O-ring 30, adapter 22 and O-ring 38 form an effective sealed closure over opening 34.

An impeller support 42 includes a drop support tube 44 extending upward through nut 36 and into neck 32. A key 46 on this tube engages an appropriate slot 48 in the neck 32 to prevent relative rotation of these parts, and set screws 50 extend through nut 36 and engage the tube 44 to retain the parts in assembled relation as illustrated in FIG. 2. At its lower end, support 42 includes an impeller housing comprising an upper plate section 52, an impeller shield section 54, and a lower support plate 56 (see also FIGS. 3 and 4). The sections 44, 52, 54 and 56 may be formed as an integral element. A spider-type journal for shaft 78 may be provided within the lower end of support 44, and may be made integral with support 44, if desired.

An impeller support spindle 60 is threaded into an opening 62 in plate 56, and is locked in position by a nut 63. The spindle 60 extends upward in axial alignment with the support tube 42 into a recess 64 in the center of a squirrel-cage type impeller 66. The upper end of the spindle 60 is rounded and serves as a bearing for rotatably supporting impeller 66 in the support housing.

The impeller may be of various forms. As illustrated, it comprises two molded sections including a bottom plate 68 having a boss 70 defining recess 64. The second section comprises a plate 72 and a plurality of integral curved blades 74 disposed around its periphery. The lower ends of the blades engage protuberances on the lower plate 68 when the two parts are assembled with the upper plate fitting over boss 70, as shown in FIG. 2. Reinforcing ribs 76 are provided in the plate 72.

A drive shaft 78 is journaled in a bearing element 80 mounted on the top of support 44. The element 80 includes a central journal sleeve 82. A retainer ring 84 snaps into an annular recess (not shown) in shaft 78 and engages the underside of boss 82. A drive magnet support, comprising hubs 88a and 88b, is secured to the upper end of shaft 78, as by a screw 90, and has axial bearing engagement on the upper end of boss 82. At its lower end the drive shaft is flattened and has a relatively loose fit in a rectangular socket 86 formed in the upper end of boss 70 thereby providing a kinematic drive joint between these parts. This provides substantial tolerance in alignment between the impeller and the drive shaft.

An annular drive magnet 93 is mounted between the hubs 88a and 88b for effecting magnetic drive coupling engagement with a smaller drive magnet (not shown) within the register 24, for instance as illustrated in Kullmann U.S. Pat. No. 3,248,583. The drive magnet 93 is disposed within a recess 94, closely adjacent the lower surface of an adapter wall section 95 of a boss extending upward closely adjacent the lower wall of register 24 to position the magnets in close proximity to one another to provide a strong magnetic drive coupling therebetween. Adapter 22, or at least wall section 95, is of non-ferromagnetic material to permit this magnetic drive-coupling between the magnet 94 and the driven magnet in the register casing.

The various described elements of course may be formed of appropriate materials. In one advantageous embodiment for metering irrigation water, the support 42, the impeller 66 and the bearing element 80 are formed of suitable plastics which are compatible with water, for instance the support 42 may be a molded styrene acrylonitrile, the bearing element may be a polyethylene or nylon and the impeller may be acetate. By making the spindle 60, drive shaft 78 and clip 84 of stainless steel and the magnet hubs 88 of non-ferromagnetic stainless steel, all parts are water compatible, and the water will serve as a lubricant for the bearings.

Shielding a portion of the impeller, at one side of the impeller, provides accurate and predictable response of the impeller to a moving stream of fluid in which the impeller assembly is immersed. As will be seen in FIGS. 3 and 5, the shield section 54 extends from the centerline of the impeller (i.e., a centerline parallel to the longitudinal axis of the conduit and thus parallel to the direction of stream flow, hereinafter referred to as the longitudinal centerline of the impeller) on the downstream side of the impeller to a point about 10° (designated as angle $a$) from the centerline on the upstream side of the impeller. By providing an adjustable shielding device to vary the coverage of the impeller at this upstream edge, the speed of rotation of the rotor relative to the stream flow velocity can be controlled through a considerable range, e.g., at least ±10% of the rotor velocity for which the register is calibrated, with little or no degradation of linearity, sensitivity and accuracy of the rotor response. Thus, a meter installation with a fixed ratio register may be readily calibrated to accommodate variations in conduit inside dimensions within a nominal pipe size designation, as is normally encountered in the varieties of conduit used in irrigation service, simply by adjusting the shield to provide accurate readout in that particular installation. Such adjustment may be accomplished with a movable shield or a movable shield section.

In the illustrated embodiment wherein the shield also serves as a support element, effective shield adjustability is conveniently afforded by providing an adjustable shield plate 96 (see FIGS. 3 and 5). Plate 96 is provided with an elongated slot 98 which admits a screw 100 for securing the plate to shield section 54 near its leading edge. By loosening screw 100, plate 96 may be selectively adjusted, within the limits imposed by slot 98, to effectively adjust the leading edge of the impeller shield. By way of one example, an adjustment range of 14° has been used with a shield section 54 of 173° to provide a shield coverage of 180°±7°. Index markings may be provided on the impeller housing, as at 102, for reference in adjusting the shield to calibrate the meter.

Thus, the shield or shroud protects one side of the impeller 66 from dynamic impingement thereon of the fluid flowing in the flow passage within conduit 8. In the illustrated embodiment, the shield section 54 also serves as the supportive connection for lower plate 56 and thus for the impeller. While a shield of about 180° is illustrated in this embodiment, the shielding function, per se, would be adequately performed by a shield of lesser angular extent, such as by a shield extending from approximately the upstream centerline through an arc of about 90°, i.e., to cover approximately one upstream quadrant of the impeller. In such a construction, posts or struts may be added between the impeller housing plates to assist in supporting the lower plate.

The most accurate meter response is normally obtained by placing the impeller in a position to be acted upon by the highest velocity portion of the stream, which is normally the center portion in a full, closed circuit. To take best advantage of this, the impeller 66 is preferably disposed with its axis of rotation normal to the direction of flow, as with such axis along a diameter of the conduit, and with the exposed portion of the impeller in the center portion of the conduit (as with the center plane of rotation of the impeller in or closely adjacent a diametral plane of the conduit).

With an adjustable shield device as disclosed herein, a standard meter assembly may be utilized under varying conditions to provide accurate results. For instance the distance between the external surface and the center of various conduits which are of the same nominal diameter but made of different materials, such as cast iron, aluminum, plastic or steel may vary somewhat. Thus the use of drop supports 44 of standard lengths may result in variations in the position of the impeller 66 with respect to the flow velocity profile in the conduit. Also, pipes of the same nominal diameter may vary somewhat in internal diameter. Using a standard meter assembly with a shielding device as disclosed herein, an installer may note the type and condition of the conduit, measure its inside diameter, set the shield to the required change in rotor speed response to compensate for the particular conditions encountered, lock the shield in position and install the meter. No open gearing of any type, no gear assortment, and no adjustment provisions for the register are required.

A standard impeller may be used for meters designed for conduits of varying sizes. The reduction of parasitic torque due to elimination of the stuffing box and right angle drive permits the use of an impeller of relatively small diameter (as compared to the diameter of the conduit) with resultant reduction in support bearing loads, viscous drag effects, stream turbulence and pressure loss. The impeller size is chosen to keep rotational speeds within conservative limits and provide convenience in handling during manufacturing, installation and maintenance. For example, in the illustrated embodiment, an impeller 2½" in diameter will rotate at approximately 1,200 revolutions per minute when subjected to a bow velocity of 14 feet per second. This approximates the maximum flow velocity normally encountered in irrigation systems or similar installations. Further, it was found that the illustrated meter with an impeller 2½" in diameter provided satisfactory metering results when used in conduits varying from 4" to 12" in diameter.

It will be obvious that various modifications of the specific embodiment shown may be made without departing from the spirit and scope of the invention.

It will thus be seen that a meter structure has been provided which is extremely simple and inexpensive to manufacture, and which is simple and easy to install. Minimum obstruction to flow of the fluid is presented by the meter whereby a low pressure drop is obtained, and a standard impeller and associated parts may be utilized in conduits of various sizes. No special housing is required, and the unit may be installed on a conventional conduit through a relatively small opening in the conduit wall, thereby facilitating sealing of the opening, as in field installed saddle mountings. A simple drive arrangement is provided, extending axially of the impeller, whereby gears are obviated, bearings are simplified, bearing loads are minimized, and drive torque requirements are minimized, resulting in a sensitive meter which also has good linearity characteristics. Further, the shield adjustment provides convenient calibration to specific installation conditions, thereby permitting the use of standardized components and sealed registers without the necessity of register calibration capabilities.

While a particular embodiment of this invention has been shown, it will be understood, of course, that the invention is not limited thereto since modifications may be made by those skilled in the art, particularly in light of the foregoing teachings. Therefore, it is contemplated by the appended claims to cover any such modifications as incorporate those features which may be said to constitute the essential features of these improvements within the true spirit and scope of the invention.

We claim:

1. Flowmeter apparatus for metering fluid flow in a closed conduit having a wall defining an elongated flow passage of fixed transverse dimensions and provided with a lateral opening therethrough, comprising supporting means including mounting means of arcuate configuration for spanning such opening and conforming to a portion of the external surface of such conduit wall therearound and a support extending from the underside of said mounting means for extending into the flow passage of such a conduit through such opening, a flow measuring unit including a rotatable impeller and a shield therefor supported on said support, said impeller being disposed with its extended axis of rotation intersecting the opening-spanning portion of said mounting means, said shield extending along and closely adjacent a substantial segment of the outer periphery of said impeller for protecting said impeller, within said segment, from impingement thereon of fluid flowing along such flow passage, said impeller projecting laterally of said shield for impingement of such flowing fluid on such projecting portion to rotate said impeller, whereby said impeller is rotatably responsive to such fluid flow, said measuring unit being disposed in spaced relation to said mounting means for positioning in such flow passage through such opening and in spaced relation to such wall when said apparatus is mounted on such a conduit, and said support being of a width substantially less than the diameter of said impeller, to allow free flow of fluid along such passage around said unit for providing a low pressure drop across said unit, and rotary drive means connected to said impeller and extending along said axis of rotation from said impeller to said mounting means for operating a register component on said mounting means in response to rotation of said impeller.

2. Flowmeter apparatus as in claim 1 including a housing on the distal end of said support with said impeller rotatably supported therein, a portion of said housing forming said shield, and a bearing member supported by said housing, said bearing member extending within said impeller from the side thereof remote from said mounting means for rotatably suspending said impeller thereon.

3. Flowmeter apparatus as in claim 1 including means for supporting a register on said opening-spanning portion for operation by said drive means.

4. Flowmeter apparatus as in claim 1 including a housing on the distal end of said support with said impeller rotatably supported therein, a portion of said housing forming said shield, a bearing member supported by said housing, said bearing member extending within said impeller from the side thereof remote from said mounting means for rotatably suspending said impeller thereon, said rotary drive means comprising a drive shaft having a loose kinematic drive-connection with said impeller, a first magnet mounted on said drive shaft adjacent said mounting means, and a register component mounted on said mounting means and having a rotatable drive magnet axially aligned with and in magnetic drive coupling relation with said first magnet.

5. Flowmeter apparatus as in claim 1 including means cooperating with said mounting means for encompassing such a conduit and securing said apparatus thereon with said mounting means over such an opening and in sealing engagement with the wall therearound.

6. Flowmeter apparatus as in claim 1 wherein said impeller is a squirrel-cage type impeller.

7. Flowmeter apparatus as in claim 1 wherein said shield extends over at least about 90° of the periphery of said impeller, with one edge of said shield adjacent the upstream centerline of said impeller when said impeller is positioned in such a conduit.

8. Flowmeter apparatus as in claim 7 wherein said shield extends over about 180° of the periphery of said impeller.

9. Flowmeter apparatus as in claim 1 including means for adjusting the coverage of said impeller by said shield.

10. Flowmeter apparatus as in claim 1 including an adjustable shield element at one edge of said shield for selectively varying the angular extent of said shield about said impeller.

11. Flowmeter apparatus as in claim 1 wherein said rotary drive means comprises a drive shaft having a loose kinematic drive-connection with said impeller.

12. Flowmeter apparatus as in claim 11 including an annular drive magnet mounted on said drive shaft adjacent said mounting means, and a register device mounted on said mounting means and having a smaller drive magnet in magnetic drive coupling relation with said annular drive magnet.

13. Flowmeter apparatus for metering fluid flow comprising wall means defining a closed conduit with an elongated flow passage of fixed transverse dimensions, support means attached to said wall means and extending into said flow passage, a flow measuring unit including a rotatable impeller and a shield therefor supported on said support means and disposed within said flow passage with the axis of rotation of said impeller transverse to said flow passage, said shield extending along and closely adjacent a segment of the outer periphery of said impeller, including substantially all of one upstream quadrant thereof, for shielding said segment from impingement thereon of fluid flowing along said flow passage, said impeller projecting laterally of said shield in the other upstream quadrant for impingement of such flowing fluid on such projecting portion to rotate said impeller, whereby said impeller is rotatably responsive to such fluid flow, said impeller and shield being of lateral dimensions substantially less than said transverse dimensions of said flow passage and being spaced from said wall means within said passage, and said support means between said measuring unit and said wall means being of a width substantially less than the diameter of said impeller, to allow free flow of fluid along said passage around said unit for providing a low pressure drop across said unit, and rotary drive means connected to said impeller and extending along said axis of rotation for operating a register component disposed externally of said flow passage in response to rotation of said impeller.

14. Flowmeter apparatus as in claim 13 wherein said wall means is provided with a lateral opening therethrough, said support means including mounting means disposed over said opening and in sealing engagement with said wall means therearound and a support extending from said mounting means through said opening into said flow passage, said impeller and said shield being supported on the distal end of said support, said impeller being disposed with its extended axis of rotation intersecting said opening, and said rotary drive means extending from said impeller to said mounting means along said axis.

15. Flowmeter apparatus as in claim 14 wherein said supporting means extends into said flow passage normal to a diametral plane of said flow passage.

16. Flowmeter apparatus as in claim 15 wherein said supporting means extends along a radius of said flow passage.

17. Flowmeter apparatus as in claim 13 wherein said impeller is disposed with its center plane of rotation in a diametral plane of said flow passage.

References Cited

UNITED STATES PATENTS

| | | | |
|---|---|---|---|
| Re. 26,654 | 8/1969 | Lee | 73—229 |
| 141,325 | 7/1875 | Cook | 73—230 |
| 233,446 | 10/1880 | Swartz et al. | 73—230 |
| 864,579 | 8/1907 | Volz | 73—230 |
| 2,023,587 | 12/1935 | Hazard | 73—229 X |
| 2,127,847 | 8/1938 | Schulte | 73—229 X |
| 1,593,291 | 7/1926 | Critchlow | 73—229 |

FOREIGN PATENTS

| | | |
|---|---|---|
| 13,228 | 5/1893 | Great Britain. |
| 1,220,626 | 7/1966 | Germany. |
| 761,950 | 12/1929 | France. |

RICHARD C. QUEISSER, Primary Examiner

J. WHALEN, Assistant Examiner

U.S. Cl. X.R.

73—231